US006983137B2

(12) United States Patent
Tobishima

(10) Patent No.: US 6,983,137 B2
(45) Date of Patent: Jan. 3, 2006

(54) ELECTRONIC APPARATUS, DRIVE MECHANISM AND DRIVE CONTROL METHOD FOR A FRONT PANEL

(75) Inventor: Yasuyuki Tobishima, Saitama (JP)

(73) Assignee: Pioneer Corporation, Tokyo (JP)

( * ) Notice: Subject to any disclaimer, the term of this patent is extended or adjusted under 35 U.S.C. 154(b) by 493 days.

(21) Appl. No.: 10/197,467

(22) Filed: Jul. 18, 2002

(65) Prior Publication Data

US 2003/0027545 A1 Feb. 6, 2003

(30) Foreign Application Priority Data

Aug. 6, 2001 (JP) .......................... P2001-238281

(51) Int. Cl.
*H04B 1/06* (2006.01)

(52) U.S. Cl. ......................... 455/346; 455/347; 362/86

(58) Field of Classification Search ................ 455/345, 455/346, 347, 348, 351, 74, 88, 90; 340/539, 340/565, 426, 455, 568; 362/86, 157, 253; 362/ 369/7

See application file for complete search history.

(56) References Cited

U.S. PATENT DOCUMENTS

| | | | | |
|---|---|---|---|---|
| 5,381,684 A * | 1/1995 | Kawamura | ..................... | 70/58 |
| 5,537,673 A * | 7/1996 | Nagashima et al. | ........ | 455/346 |
| 5,590,949 A * | 1/1997 | Kim | ............................ | 362/86 |
| 5,923,624 A * | 7/1999 | Groeger et al. | ................ | 369/7 |
| 6,246,890 B1 * | 6/2001 | Sato et al. | .................. | 455/573 |
| 6,483,428 B1 * | 11/2002 | Fish et al. | ............... | 340/425.5 |
| 2002/0132604 A1 * | 9/2002 | Sasaki et al. | ............... | 455/345 |

FOREIGN PATENT DOCUMENTS

| | | | |
|---|---|---|---|
| DE | 36 19 586 | A1 | 12/1987 |
| DE | 298 02 205 | U1 | 5/1998 |
| EP | 0 868 116 | A1 | 9/1998 |
| EP | 1 020 329 | A1 | 7/2000 |
| WO | WO 98/17503 | A1 | 4/1998 |

OTHER PUBLICATIONS

Japanese Abstract No. 2001151028, dated Jun. 5, 2001.

* cited by examiner

*Primary Examiner*—Edward F. Urban
*Assistant Examiner*—Thuan Nguyen
(74) *Attorney, Agent, or Firm*—Sughrue Mion, PLLC

(57) ABSTRACT

An electronic apparatus includes, an electronic apparatus main unit, a front panel attached at the front of the electronic apparatus main unit detachably from the electronic apparatus main unit. The electronic apparatus has a driving section provided at the electronic apparatus main unit to drive the front panel, a main-unit-side communications element to perform signal communications to/from the front panel, a battery provided at the front panel for storing power fed from the electronic apparatus main unit, a panel-side communications element to perform signal communications to/from the main-unit-side communications element. The electronic apparatus has a controller for controlling the driving section in order for the driving section to drive the front panel in a state where recharging of the front panel is allowed in case the charge voltage of the battery has dropped below a preset reference value.

7 Claims, 8 Drawing Sheets

ELECTRONIC APPARATUS, DRIVE MECHANISM AND DRIVE CONTROL METHOD FOR A FRONT PANEL

BACKGROUND OF THE INVENTION

1. Field of the Invention

The present invention relates to an electronic apparatus, a drive mechanism and a drive control method for a front panel and in particular to a drive mechanism and a drive control method for a front panel of electronic apparatus such as AV apparatus, audio apparatus and a car navigation system mounted on a vehicle including an automobile.

2. Description of the Related Art

Related art drive mechanisms for a front panel include those shown in FIG. 8A and FIG. 8B. Electronic apparatus 101 equipped with the drive mechanism is incorporated into for example the instrumental panel in front of the gap between front seats of an automobile, and arranged below the line of sight of the driver sitting in the driver's seat and the crew member sitting in the seat next to the driver and offset from both crew members.

The drive mechanism for the electronic apparatus 101 is arranged to drive a front panel 107 so that the front face of the front panel 107 equipped with a display 103 and an operation section 105 faces upward, for the purpose of efficiently utilizing the front face of the electronic apparatus 101. For example, the drive mechanism exposes the front face of the electronic apparatus 101 in forward direction by vertically driving the front panel 107 to form an inlet for a recording medium such as a CD thus efficiently utilizing the front face of the electronic apparatus 101.

The left and right ends of the front panel 107 are supported slidably and rotatably by a pair of left and right drive mechanisms 111L, 111R provided on a support frame 109. The sliding/rotating operation allows the front face of the front panel 107 equipped with the operation section 105 and the display 103 to rotate upward.

The front panel 107 is electrically connected to electronic apparatus main unit 113 via a flexible flat cable 115. Thus, the front panel 107 can be activated even when it is rotated vertically.

However, in the drive mechanism of the related art front panel mentioned earlier, the front panel 107 is connected to the electronic apparatus main unit 115 via the flat cable 115. Thus the direction the front panel 107 is driven is restricted, as shown in FIG. 8B.

That is, because the front panel 107 is connected to the electronic apparatus main unit 115 via the flat cable, it is difficult to drive the front panel in a direction other than the vertical direction, thus restricting the drive direction and preventing the visibility of the driver and the crew member in the seat next to the driver.

SUMMARY OF THE INVENTION

The object of the invention, contemplated with regard to such related art problems, is to provide an electronic apparatus, a drive mechanism and a drive control method for a front panel that diversify the drive direction of the front panel thus upgrading the visibility of the crew members in the front seats as well as stably activates the front panel.

In order to solve the problems, the first aspect of the invention is a drive mechanism for a front panel that drives a front panel attached at the front of electronic apparatus main unit detachably from the electronic apparatus main unit, wherein the electronic apparatus main unit comprises a driving section to drive the front panel and a main-unit-side communications element to perform signal communications to/from the front panel, the front panel comprises a battery for storing power fed from the electronic apparatus main unit and a panel-side communications element to perform signal communications to/from the main-unit-side communications element, the drive mechanism including a controller for controlling the driving section in order for the driving section to drive the front panel in a state where recharging of the front panel is allowed in case the charge voltage of the battery has dropped below a preset reference value.

Also, there is provided an electronic apparatus including: an electronic apparatus main unit; a front panel attached at the front of the electronic apparatus main unit detachably from the electronic apparatus main unit; a driving section provided at the electronic apparatus main unit to drive the front panel; a main-unit-side communications element to perform signal communications to/from the front panel; a battery provided at the front panel for storing power fed from the electronic apparatus main unit; a panel-side communications element to perform signal communications to/from the main-unit-side communications element; and a controller for controlling the driving section in order for the driving section to drive the front panel in a state where recharging of the front panel is allowed in case the charge voltage of the battery has dropped below a preset reference value.

According to the drive mechanism for a front panel in the configuration, the front panel and the electronic apparatus main unit perform signal communications by using the panel-side communications element and the main-unit-side communications element and the front panel comprises a battery as a separate power source. Thus, wiring by using flat cables is not necessary for feeding power from the electronic apparatus main unit. This assures the freedom of the driving direction of the front panel.

Further, the charge voltage of the battery is constantly monitored. In case the voltage of the battery has dropped below a preset reference value, the driving section is controlled to drive the front panel back to the state where recharging of the front panel is allowed thereby recharging the battery. This allows the front panel to be stably activated.

The second aspect of the invention is a drive mechanism for a front panel, characterized in that the driving section drives the front panel so as to allow the angle of the panel to be changed in the transverse and vertical directions.

According to the drive mechanism for a front panel in the configuration, the front panel can be driven in the transverse direction and the vertical direction at the same time so that it is possible to drive the front panel in various directions to upgrade the visibility.

For example, when the drive mechanism for a front panel in the configuration is separately provided as left and right driving sections and these driving sections are simultaneously drive-controlled to shift the front panel by the same amount, the front panel rotates in the vertical direction (vertical oscillation).

When control is made to provide different travel amount by the left and right driving sections, the front panel rotates in the transverse direction (transverse oscillation) as well as in the vertical direction.

The third aspect of the invention is a drive mechanism for a front panel, characterized in that the driving section comprises a driving motor for generating a driving force, a transmission section for transmitting a driving force from the driving motor, a lower frame arranged in the lower area of the front panel, a pair of lateral frames one end of which is connected to the lower frame and the other end of which is connected to the transmission section, a connecting arm one end of which is linked to the upper area of the front panel and the other end of which working as a fulcrum is linked to an activating spring, and a slot that supports the fulcrum of the connecting arm movably when the front panel rotates in the horizontal plane.

According to the drive mechanism for a front panel in the configuration, the lower frame in the lower area of the front panel is traveled back and forth with a driving force of the driving motor via the transmission section while back-and-force travel of the upper area of the front panel is restricted by the connecting arm, so that the front panel rotates while facing its front surface upward. While the connecting arm is normally in position by the activating spring it can travel along the slot so that it is possible to rotate the connecting arm in the transverse direction in the horizontal plane.

The fourth aspect of the invention is a drive control method for a front panel that drives a front panel attached at the front of electronic apparatus main unit detachably from the electronic apparatus main unit, wherein the drive control method comprises a step of automatically driving the front panel in a state where recharging of the front panel is allowed in case the charge voltage of a battery provided on the front panel for storing power fed from the electronic apparatus main unit has dropped below a preset reference value.

According to the drive control method for a front panel in the configuration, the charge voltage of the battery provided on the front panel is constantly detected and monitored. In case the voltage of the battery has dropped below a preset reference value, the battery is recharged. In case the front panel is not in the state where recharging of the front panel is allowed, the front panel is automatically driven back to the state where it can be recharged. Thus, it is possible to stably activate the front panel without fail.

DETAILED DESCRIPTION OF THE PRESENT INVENTION

Figure 1:
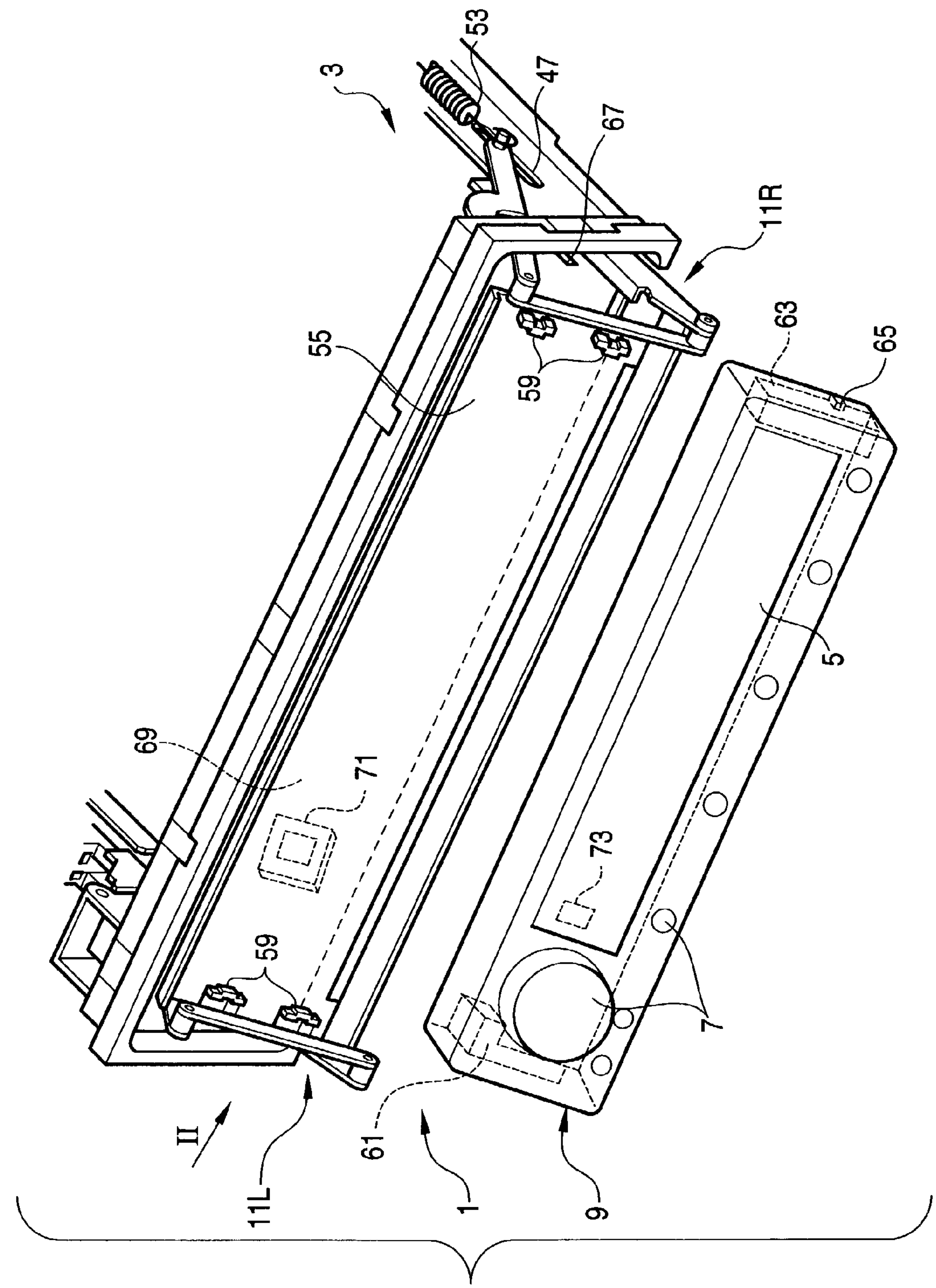
FIG. 1 is partial perspective view showing a drive mechanism for a front panel according to the invention.

An embodiment of a drive mechanism for front panels according to the invention will be detailed referring to FIGS. 1 through 7. FIG. 1 shows an example of electronic apparatus 1 such as AV apparatus, audio apparatus and car navigation systems mounted on automobiles.

As shown in FIG. 1, the electronic apparatus 1 includes an operation display panel 9 having a display 5 for displaying at least various data provided at the front of electronic apparatus main unit 3 and an operation section 7 for performing operation of the electronic apparatus 1.

Figure 2:
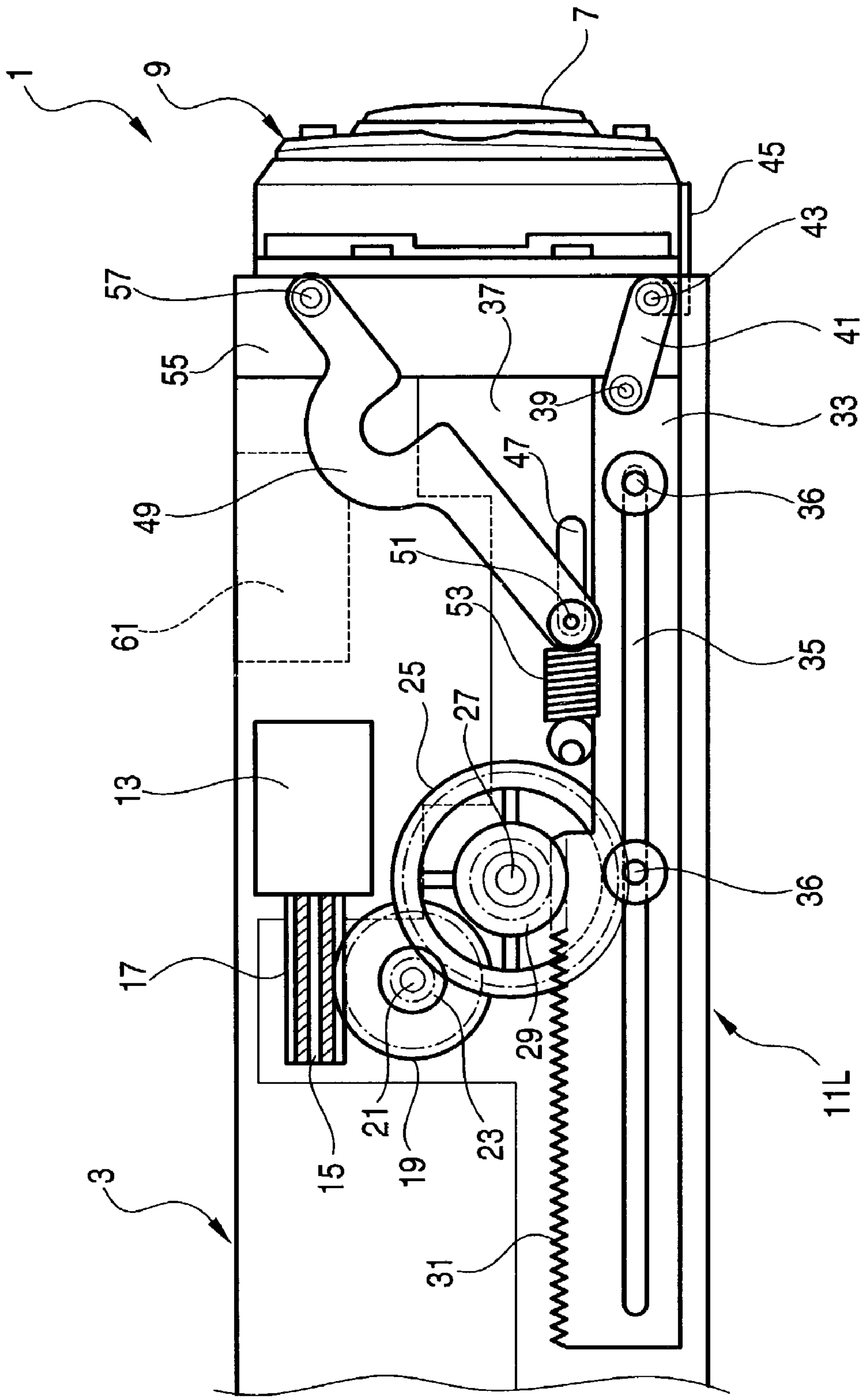
FIG. 2 is a side view of FIG. 1 seen from the direction of II.
Figure 3:
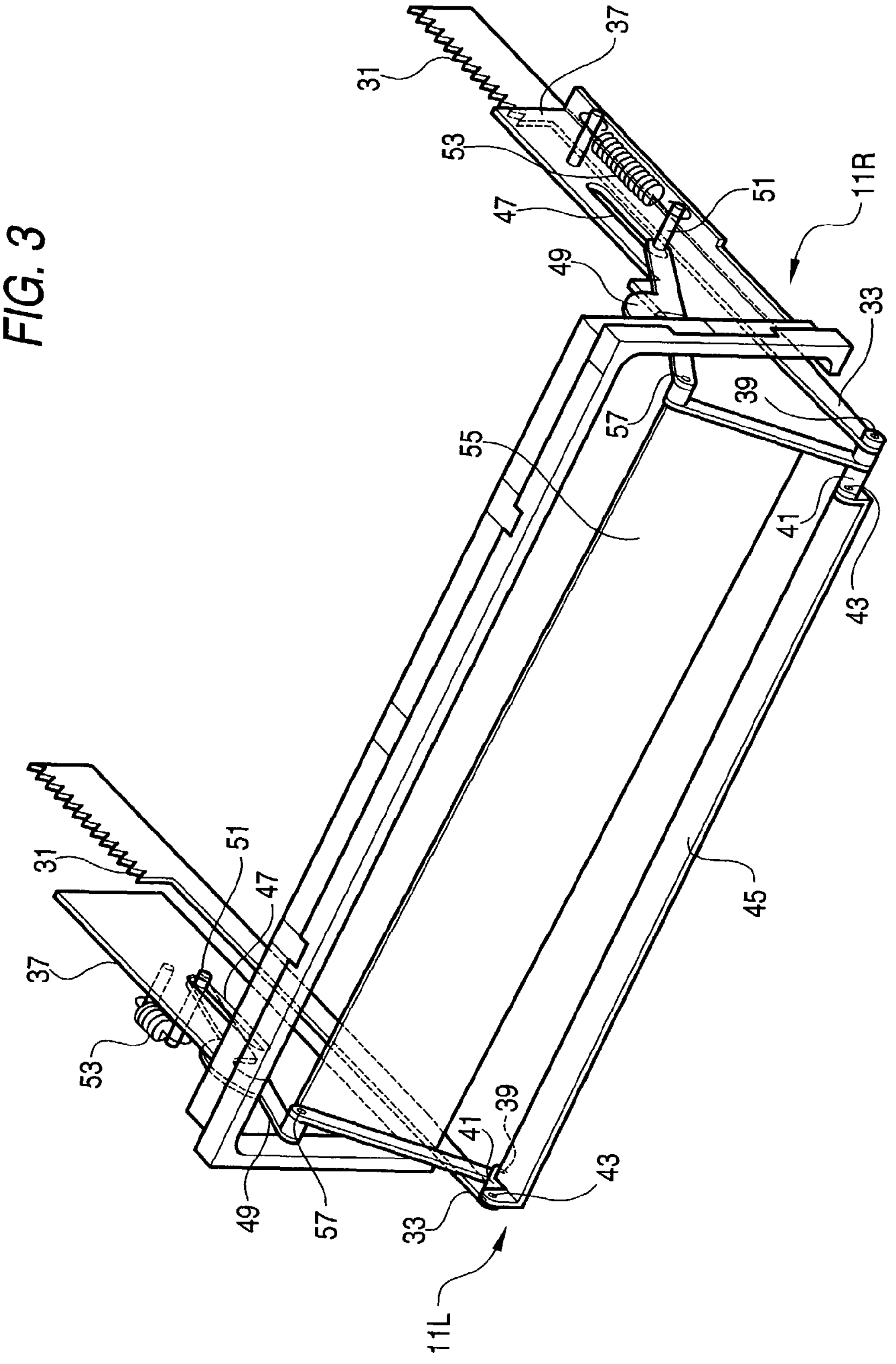
FIG. 3 shows the general structure of a driving section in FIG. 1.

As shown in FIGS. 2 and 3, the electronic apparatus main unit 3 has a pair of driving sections 11L, 11R for rotatably supporting the operation display panel 9 in the transverse and vertical directions. Each of the left and right driving sections has the same configuration. In the following description, the left driving section 11L is described referring to FIG. 2 except for a case where left and right driving sections must be distinguished from each other.

The driving section 11 has a driving motor 13 as a source of power and a worm gear 17 attached to the rotation shaft of the driving motor 13, the worm gear constituting part of a transmission section for transmitting the driving force of the driving motor. A worm wheel that engages the worm gear 17 is rotatably supported by a rotation shaft 21.

On the rotation shaft of the worm wheel 19 is integrally provided a first idle gear as a gear train. A second idle gear 25 that engages the first idle gear 23 is rotatably supported by the rotation shaft 27.

To the rotation shaft is attached a pinion 29. A rack 31 that engages the pinion is provided along the back-and-forth direction (side-to-side direction in FIG. 2).

The rack 31 is attached to the upper area of the rear of the lateral frame 33 (left portion in FIG. 2). Into the lateral frame 33 is notched a slot 35 along the approximate length in the back-and-forth direction. The lateral frame 33 is supported in a reciprocating way in the back-and-forth direction with regard to a main unit frame 37 by two bolts 36, 36 jointed into the main unit frame 37.

The front end of the lateral frame 33 is connected to the lower frame 45 via a link plate 41 and pins 39, 43.

In the main unit frame 37 of the electronic apparatus main unit 3 is notched a slot 47 and the lower end of a connecting arm 49 is slidably attached to the slot 47 by a pin 51.

The pin 51 is constantly urged backward by an activating spring 53. To the upper end of the connecting arm 49 and the front end of the lateral frame 33 is rotatably attached a fitting plate 55 by pins 43, 57, respectively.

Thus, when control is made to simultaneously drive the left and right driving motors 13 and the drive motors 13 rotate the worm gear 17, the pinion 29 is rotated via the worm wheel 19, the first idle gear 23 and the second idle gear 25, which causes the rack 31 to travel in the back-and-forth direction.

When the forward travel of the left and right racks 31 causes the left and right lateral frames 33 to push the lower end of the fitting plate 55 ahead of the electronic apparatus 1 at the same time, the fitting plate 55 rotates counterclockwise in FIG. 2 and faces upward (the state shown in FIG. 3).

The operation display panel 9 and the fitting plate 55 that detachably attaches the operation display panel 9 correspond to the front panel of the invention.

In case the travel amount of each of the left and right driving sections 11L, 11R in the back-and-forth direction is made different from each other by controlling the driving motors 13L, 13R of the left and right driving sections 11L, 11R to drive the front panel individually, the fitting plate rotates in the horizontal plane (transverse oscillation). In this practice, the lower end of the connecting arm 49 travels forward along the slot 47 against the activating spring 53 that activates the lower end of the connecting arm 49 backward, thereby reflecting the difference in the travel amount of the lateral frames in the back-and-forth direction.

Figure 4A:
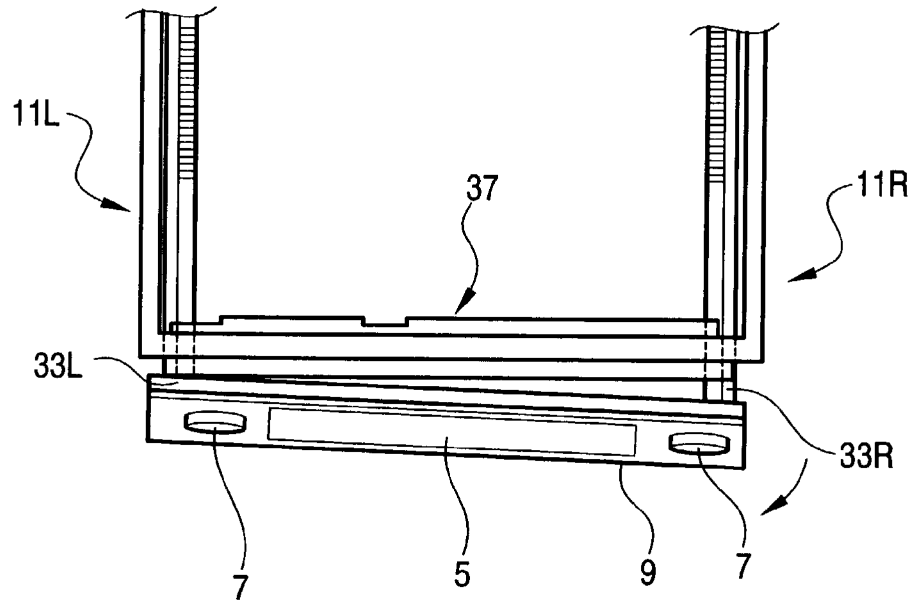
FIG. 4A is a plan view of FIG. 1 showing that the front panel has oscillated leftward in the transverse direction in the horizontal plane.
Figure 4B:
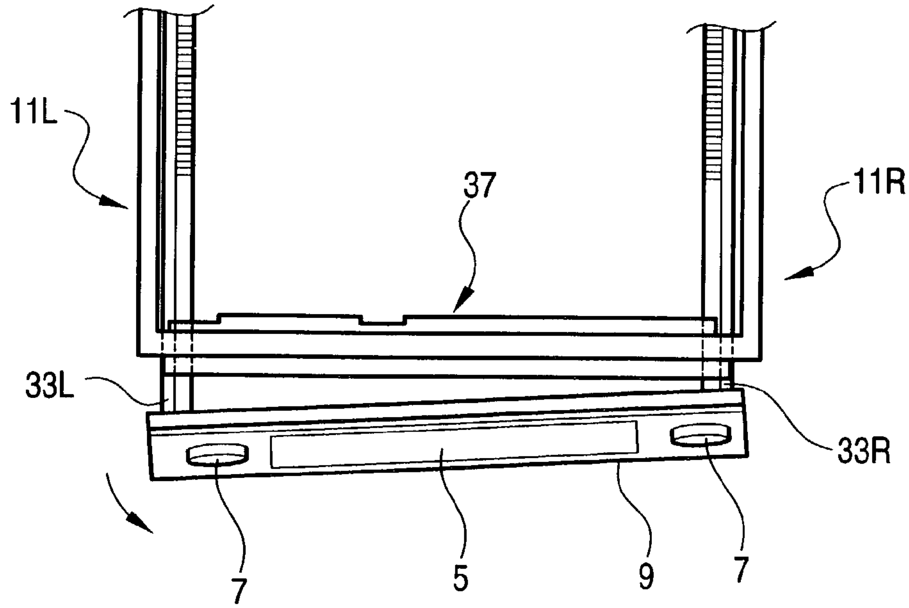
FIG. 4B is a plan view of FIG. 1 showing that the front panel has oscillated rightward in the transverse direction in the horizontal plane.

For example, when the right driving section is caused to travel a greater distance than the left driving section 11L, the operation display panel 9 rotates clockwise in the horizontal plane, as shown in FIG. 4A. When the left driving section is caused to travel a greater distance, the operation display panel 9 rotates counterclockwise in the horizontal plane, as shown in FIG. 4B.

As shown in FIG. 1, the operation display panel 9 is detachably attached for example by a plurality of engaging projections 59 as means for attaching the operation panel provided on the left and right sides of the fitting plate. Alternatively, magnets may be attached to the operation display panel 9 and the fitting plate 55 to detachably attach the operation display panel 9 via magnetic force.

Further, the operation display panel 9 incorporates a microcomputer 61 as a controller for performing functions as the display 5 and the operation section 7 and a battery 63 as a power source. A panel-side charging terminal 65 for recharging the battery 63 is provided on the operation display panel 9.

As mentioned later, recharging of the battery 63 in the operation display panel 9 is made in the initial state where the operation display panel 9 is attached to the fitting plate 55 and the fitting plate 55 is closed (see FIG. 2). Thus a main-unit-side charging terminal 67 connected to the panel-side charging terminal 65 is provided on the main unit frame 37 corresponding to the panel-side charging terminal 65.

On a front plate 68 of the main unit frame 37 is provided a main-unit-side communications element 71 for communicating signals by way of infrared rays and radio waves, at the position corresponding to the through hole formed in the fitting plate 55. At the corresponding position at the rear of the operation display panel 9 is attached a panel-side communications element 73. Accordingly, signal communications between the electronic apparatus main unit 3 and the operation display panel 9 are made using the communications elements 71, 73. This eliminates the use of wiring such as flat cables employed in the related art.

Figure 5:
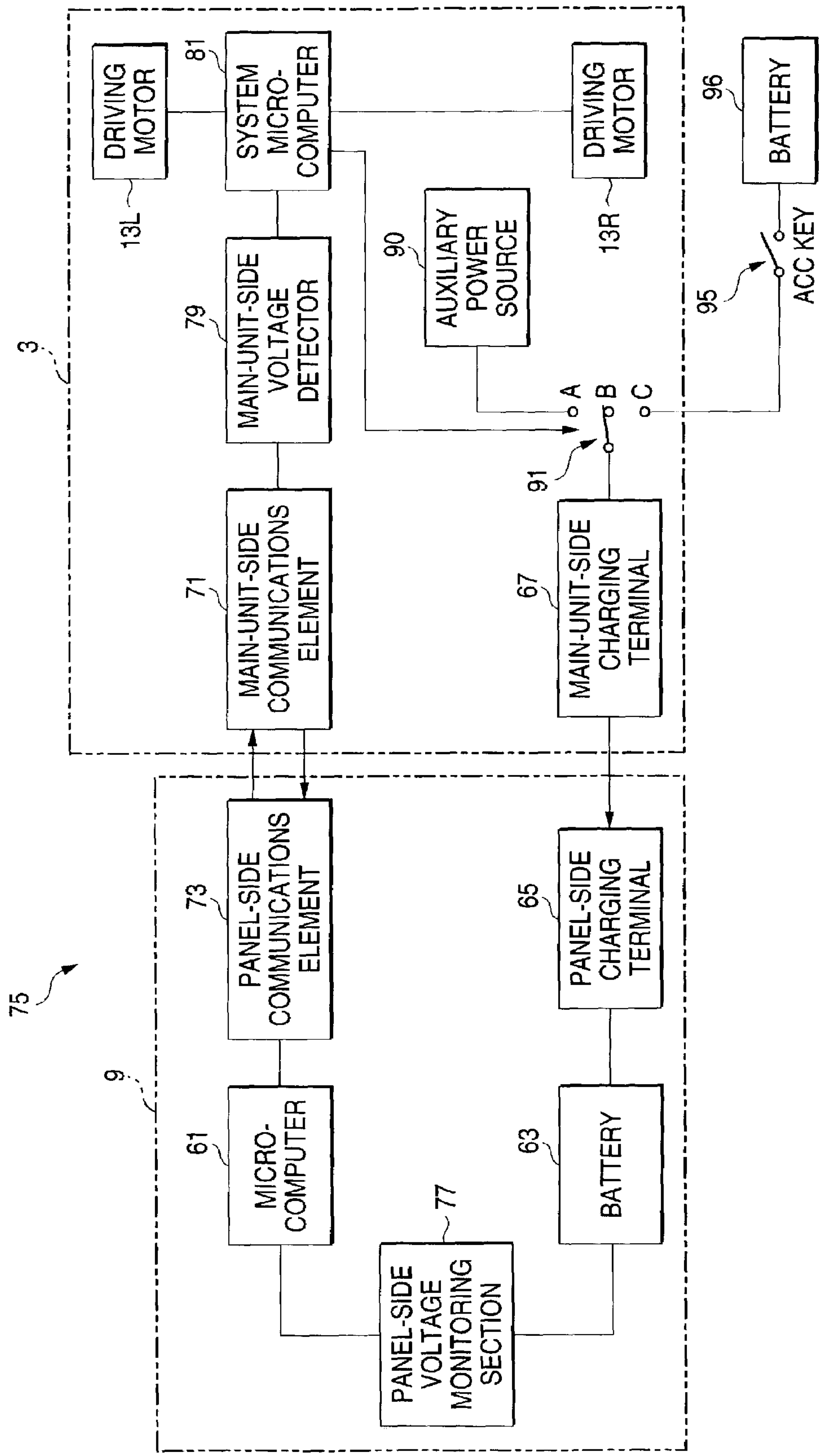
FIG. 5 shows the configuration of charging apparatus in FIG. 1.

Configuration of charging apparatus 75 for recharging the battery 63 will be described referring to FIG. 5. The operation display panel 9 includes the aforementioned battery 63, a panel-side voltage monitoring section 77 for constantly monitoring the charge voltage of the battery 63, a microcomputer 61, a panel-side communications element 73, and a panel-side charging terminal 65.

The electronic apparatus main unit 3 includes a main-unit-side communications element 71, a main-unit-side voltage detector 79 for detecting whether the charge voltage of the battery 63 exceeds the reference value, a system microcomputer 81 composed of a microprocessor that controls the driving motors 13L, 13R of the left and right driving sections 11L and 11R, a main-unit-side charging terminal 67, an auxiliary power source 90, and a switch section 91 connected to the main-unit-side charging terminal 67 for selecting switch positions under control by the system microcomputer 81.

In the charging apparatus 75 thus configured, the panel-side voltage monitoring section 77 constantly monitors the charge voltage of the battery 63. In accordance with an instruction from the microcomputer 61, the panel-side voltage monitoring section 77 supplies a signal that indicates the charge voltage of the battery 63 to the microcomputer 61. The microcomputer 61 supplies the signal to the main-unit-side voltage detector 79 via the panel-side communications element 73 and the main-unit-side communications element 71. The main-unit-side voltage detector 79 compares the supplied voltage with the preset reference value and detects whether the voltage value of the battery 63 exceeds the reference value. The main-unit-side voltage detector 79 supplies the detection result to the system microcomputer 81. The system microcomputer 81 performs drive control of the driving motors 13L, 13R based on the detection result. When the operation display panel 9 and the fitting plate 55 are rotated, drive control is made to return the driving motors 13L, 13R back to the initial state. When the panel-side charging terminal 65 is connected to the main-unit-side charging terminal 67, the battery 63 is recharged.

Figure 6:
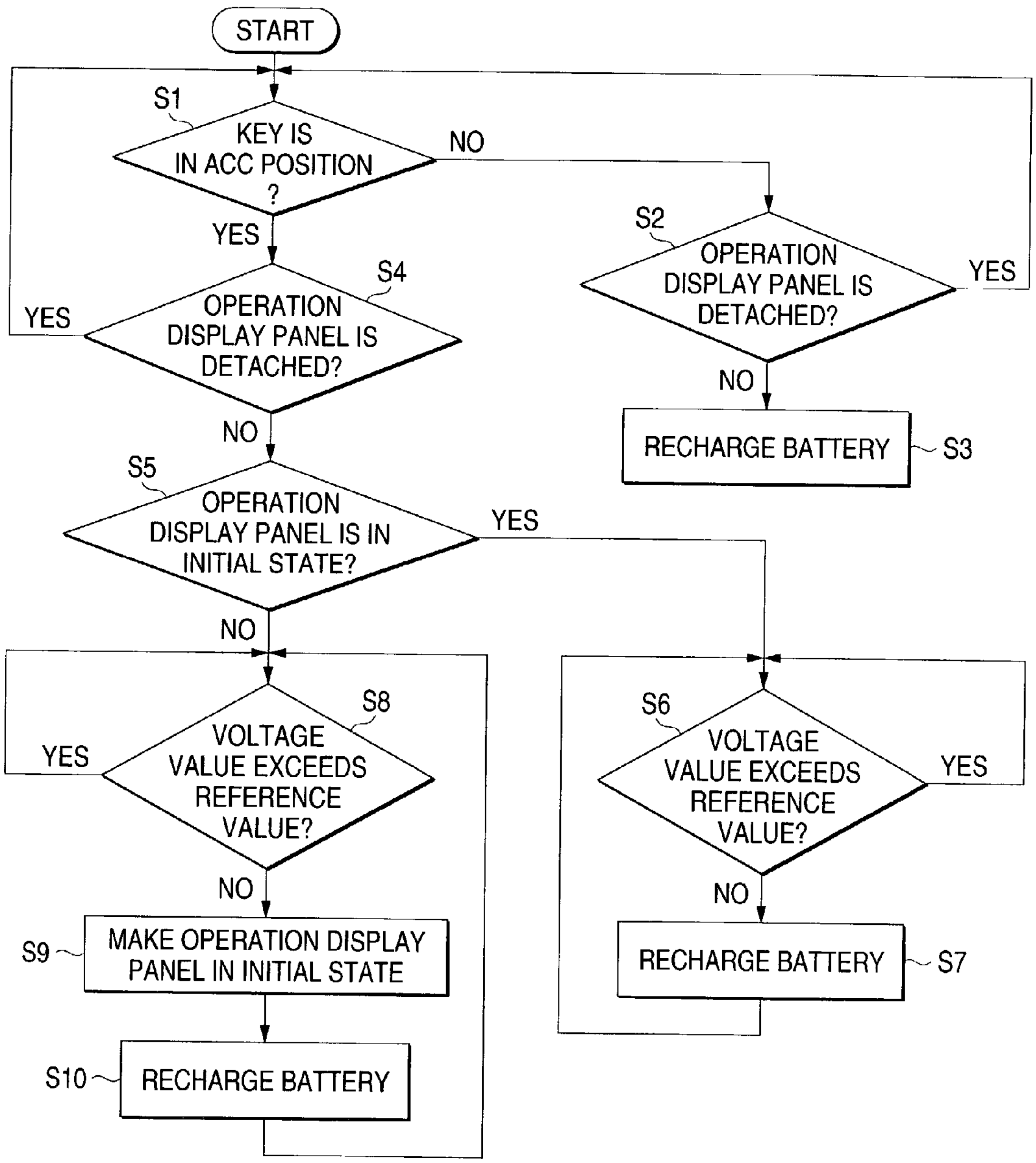
FIG. 6 is a flowchart showing a drive control method for a driving section for recharging the battery in the front panel of FIG. 1.

Recharging by the aforementioned charging apparatus 75 will be described referring to FIG. 6 and FIG. 7.

The system microcomputer 81 determines the key state of the automobile (step S1) and in case an ACC key 95 is not in the ACC position (ACC key 95 is off), that is, in case power is not fed from a battery 96 mounted on the automobile, the system microcomputer 81 determines whether the operation display panel 9 is detached from the fitting plate 55 (step S2). This determination is made based on the presence/absence of reception of a signal from the panel-side communications element 73. In case the system microcomputer 81 has determined that the operation display panel 9 is detached from the fitting plate 55, execution returns to step S1. In case the system microcomputer 81 has determined that the operation display panel 9 is not detached from the fitting plate 55, the battery 63 is recharged (step S3). In this practice, the system microcomputer 81 controls the switch section 91 to place the switch in the position of terminal A on the auxiliary power source 90. The operation display panel 9 and the fitting plate 66 are in the initial state. The panel-side charging terminal 65 and main-unit-side charging terminal 67 are connected to each other. Thus, power from the auxiliary power source 90 is fed to the battery 63 via the switch section 91, the main-unit-side charging terminal 67 and the panel-side charging terminal 65.

In case it is determined that the key is in the ACC position (ACC key 95 is off) in step S1, that is, in case power is fed from the battery 96 mounted on the automobile, the system microcomputer 81 determines whether the operation display panel 9 is detached from the fitting plate 55, same as step S2 (step S4). Power feed from the battery 96 activates various features of the electronic apparatus main unit. In case the system microcomputer 81 has determined that the operation display panel 9 is detached from the fitting plate 55, execution returns to step S1.

In case the system microcomputer 81 has determined that the operation display panel 9 is not detached from the fitting plate 55 in step S4, the system microcomputer 81 determines whether the operation display panel 9 and the fitting plate 55 are in the initial state, that is, whether they are not rotated (step S5). This determination is made by checking whether the system microcomputer 81 is performing drive control of the driving motors 13L, 13R. In case the system microcomputer 81 has determined that the operation display panel 9 and the fitting plate 55 are in the initial state, that is, in case the system microcomputer 81 is not performing drive control of the driving motors 13L, 13R, the system microcomputer 81 sends a control signal to the microcomputer 61 via the main-unit-side communications element 71 and the panel-side communications element 73. The microcomputer 61 controls the panel-side voltage monitoring section 77 and sends a signal that indicates the voltage value of the battery 63 to the main-unit-side voltage detector 79. The main-unit-side voltage detector 79 determines whether the received voltage value exceeds the reference value and supplies the detection result to the system microcomputer 81.

In case the detection results shows that the voltage value exceeds the reference value (step S6: YES), the system microcomputer 81 continues monitoring the detection result supplied from the main-unit-side voltage detector 79. In case the value is equal to or below the reference value (step S6: NO), the system microcomputer 81 controls the switch section 91 to place the switch in the position of terminal C on the battery 96 and recharges the battery 63 via the panel-side charging terminal 65 from the main-unit-charging terminal 67 (step S7). The system microcomputer 81, detecting that the charge voltage has exceeded the reference value (reached the upper limit), place the switch in the switch section 91 in the position of terminal B to finish recharging, and continues monitoring the detection result from the main-unit-side voltage detector 79.

Figure 7:
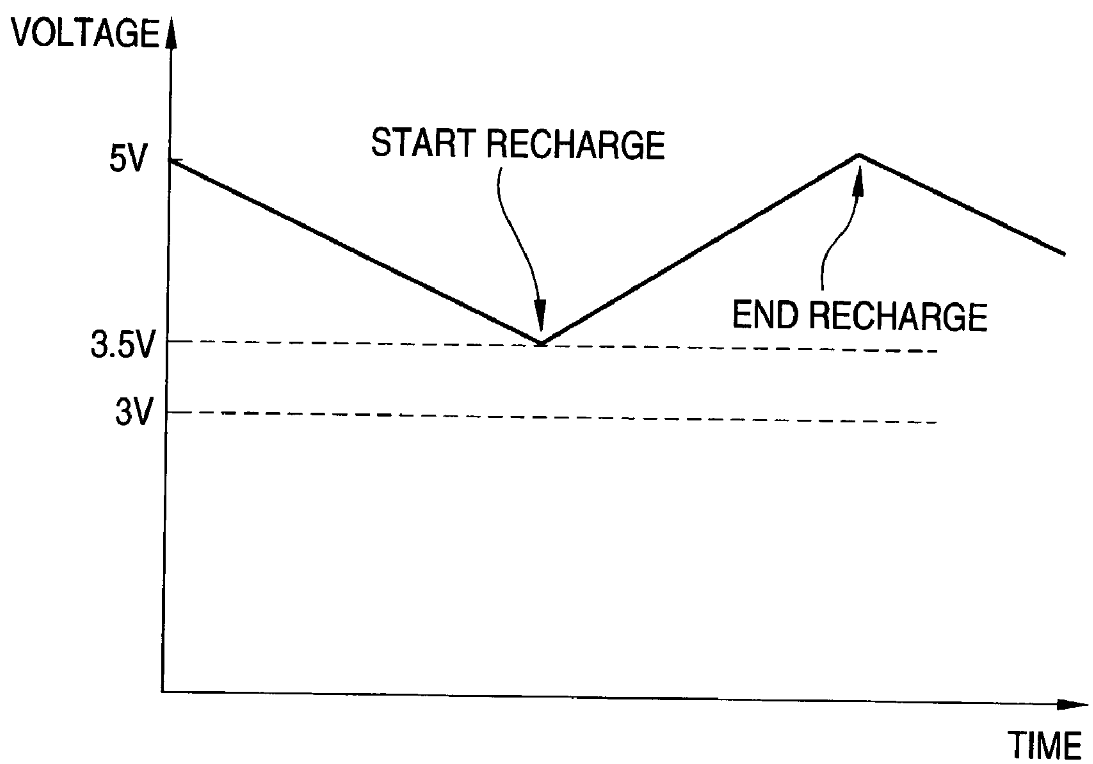
FIG. 7 is a graph showing a reference value as a criteria for recharging the battery in FIG. 6.
Figure 8A:
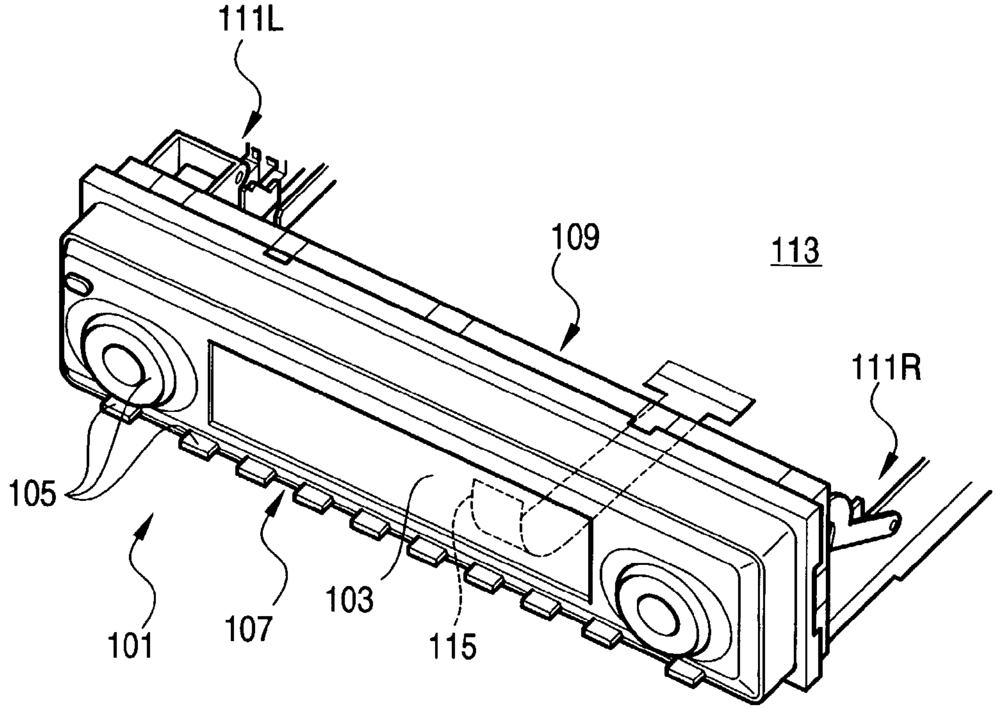
FIGS. 8A and 8B is perspective views showing the drive mechanism for a related art front panel.
Figure 8B:
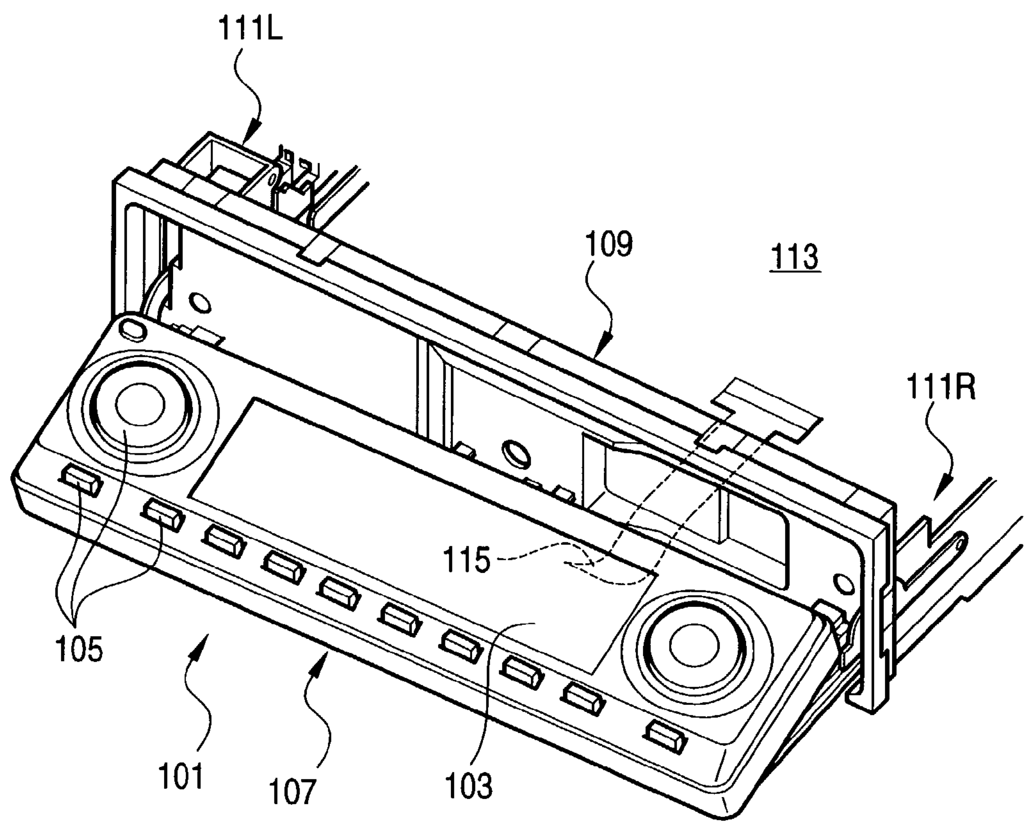

Voltage detection of the battery 63 (by the main-unit-side voltage detector 79) is made by determining whether the voltage of the battery 63 exceeds 3.5 V preset as a reference value, as shown in FIG. 7. The main-unit-side voltage detector 79 has a comparator and compares the charge voltage of the battery fed from the panel-side voltage monitoring section 77 with the preset reference value (3.5 V) and supplies the comparison result to the system microcomputer 81. For example, the main-unit-side voltage detector 79 obtains the difference between the charge voltage and the reference value and detects that the reference value is exceeded in case the difference is a positive value and detects that the charge voltage is equal to or below the reference value in case the difference is zero or a negative value.

A reference value of 3.5 V is a value that allows for some margin over the minimum voltage of 3 V that can successfully activate the operation display panel 9. By using a reference value that allows for some margin, it is possible to stably activate the operation display panel 9 without fail.

The upper limit value of the charge voltage of the battery 63 is set to 5 V. The system microcomputer 81 controls the switch section 91 so that power feed is halted when the charge voltage of the battery 63 fed from the panel-side voltage monitoring section 77 has reached 5 V.

Referring to FIG. 6 again, in case the system microcomputer 81 has determined that the operation display panel 9 and the fitting plate 55 are not in the initial state, that is, rotated in step 5, the system microcomputer 81 determines whether the detection result exceeds the reference value based on the detection result from the main-unit-side voltage detector 79, same as the step S6.

In case the detection result exceeds the reference value (step S8: YES), the system microcomputer 81 continues monitoring the detection result from the main-unit-side voltage detector 79. In case the detection result is below the reference value (step S8: NO), the system microcomputer 81 controls the driving motors 13L, 13R to drive the operation display panel 9 and the fitting plate 55 into the initial state. In this practice, the system microcomputer 81 simultaneously performs drive control of the driving motors 13L and 13R to place the driving motors 13L and 13R in case it performs simultaneous drive control of the driving motors 13L and 13R (in case the operation display panel 9 and the fitting plate 55 are rotated in the vertical direction).

In case the driving motors 13L and 13R are individually drive-controlled (in case the operation display panel 9 and the fitting plate 55 are rotated in the transverse direction), each driving motors is individually drive-controlled and placed in the initial state (step S9). The switch section 91 is controlled to place the switch in the position of terminal C and power is fed to the battery 63 via the main-unit-side charging battery 67 and the panel-side charging terminal 65 thus recharging the battery 63 (step S10).

As mentioned earlier, according to a drive mechanism and a drive control method for a front panel of this embodiment, it is possible to cause the driving motors 13L, 13R of the left and right driving sections 11L, 11R in the transverse direction (oscillate transversely) by individually controlling the driving motors 13L, 13R of the left and right driving sections 11L, 11R. Thus, it is possible to direct the display 5 or operation section 7 of the operation display panel 9 for example to the driver or the seat next to the driver, thus upgrading the operability and visibility of the electronic apparatus 1.

In this practice, the operation display panel 9 and the electronic apparatus main unit 3 communicate signals with each other via the communications elements 73, 71 without using flat cables employed in the related art, thereby eliminating restriction on the drive direction of the front panel.

The battery 63 is incorporated as a power source in the operation display panel 9. Charging state of the battery 63 is constantly monitored by detecting the voltage of the battery 63. Drive control is made and the battery 63 is recharged when the voltage has dropped below the reference value. This allows the operation display panel 9 to be activated successfully without fail.

While the front panel is described as the operation display panel 9 and the fitting plate 55, other configurations are allowed. For example, only the operation display panel 9 may be used as a front panel, without using the fitting plate 55. In such a case, the front ends of the left and rite lateral frames 33 are connected to the lower area of the sides on the operation display panel 9 via the link plate 41 and pins 39, 43. In this case, the bottom of the operation display panel 9 corresponds to the lower frame 45. The upper ends of the left and right connecting arms 49 are linked to the upper ends of the sides of the operation display panel 9. Thus the operation display panel 9 is rotatably attached to the electronic apparatus 1 by the pins 39, 43.

The invention is not limited to the foregoing embodiment and can be implemented in various embodiments within the scope of the invention.

As mentioned earlier, a drive mechanism and a drive control method for a front panel according to the invention do not use flat cables thus allowing the front panel to be rotated in the vertical direction and the transverse direction and diversifying the drive direction of the front panel, thereby upgrading the operability and visibility of the front panel.

Further, the charging state of the battery as a power source of the front panel is monitored and detected and drive control of the front panel is made depending on the driving state of the front panel. This activates the front panel stably without fail.

What is claimed is:

1. An electronic apparatus comprising:

an electronic apparatus main unit;

a front panel attached at the front of the electronic apparatus main unit detachably from the electronic apparatus main unit;

a driving section provided at the electronic apparatus main unit to drive the front panel;

a main-unit-side communications element to perform signal communications to/from the front panel;

a battery provided at the front panel for storing power fed from the electronic apparatus main unit;

a panel-side communications element to perform signal communications to/from the main-unit-side communications element; and a controller for controlling the driving section in order for the driving section to drive the front panel in a state where recharging of the front panel is allowed in case the charge voltage of the battery has dropped below a preset reference value.

2. The electronic apparatus according to claim 1, wherein the driving section drives the front panel so as to allow the angle of the panel to be changed in the transverse and vertical directions.

3. The electronic apparatus according to claim 1, wherein the driving section comprises a driving motor for generating a driving force, a transmission section for transmitting a driving force from the driving motor, a lower frame arranged in the lower area of the front panel, a pair of lateral frames one end of which is connected to the lower frame and the other end of which is connected to the transmission section, a connecting arm one end of which is linked to the upper area of the front panel and the other end of which working as a fulcrum is linked to an activating spring, and a slot that supports the fulcrum of the connecting arm movably when the front panel rotates in the horizontal plane.

4. A drive mechanism for a front panel that drives a front panel attached at the front of electronic apparatus main unit detachably from the electronic apparatus main unit, wherein the electronic apparatus main unit comprises a driving section to drive the front panel and a main-unit-side communications element to perform signal communications to/from the front panel, the front panel comprises a battery for storing power fed from the electronic apparatus main unit and a panel-side communications element to perform signal communications to/from the main-unit-side communications element, the drive mechanism comprising a controller for controlling the driving section in order for the driving section to drive the front panel in a state where recharging of the front panel is allowed in case the charge voltage of the battery has dropped below a preset reference value.

5. The drive mechanism for a front panel according to claim 4, wherein the driving section drives the front panel so as to allow the angle of the panel to be changed in the transverse and vertical directions.

6. The drive mechanism for a front panel according to claim 4, wherein the driving section comprises a driving motor for generating a driving force, a transmission section for transmitting a driving force from the driving motor, a lower frame arranged in the lower area of the front panel, a pair of lateral frames one end of which is connected to the lower frame and the other end of which is connected to the transmission section, a connecting arm one end of which is linked to the upper area of the front panel and the other end of which working as a fulcrum is linked to an activating spring, and a slot that supports the fulcrum of the connecting arm movably when the front panel rotates in the horizontal plane.

7. A drive control method for a front panel that drives a front panel attached at the front of electronic apparatus main unit detachably from the electronic apparatus main unit, wherein the drive control method comprises a step of automatically driving the front panel in a state where recharging of the front panel is allowed in case the charge voltage of a battery provided on the front panel for storing power fed from the electronic apparatus main unit has dropped below a preset reference value.

* * * * *